United States Patent [19]

Patel

[11] Patent Number: 5,789,349
[45] Date of Patent: Aug. 4, 1998

[54] WATER-BASED DRILLING FLUIDS WITH HIGH TEMPERATURE FLUID LOSS CONTROL ADDITIVE

[75] Inventor: Arvind D. Patel, Houston, Tex.

[73] Assignee: M-I Drilling Fluids, L.L.C., Houston, Tex.

[21] Appl. No.: 614,681

[22] Filed: Mar. 13, 1996

[51] Int. Cl.$^6$ ............................................. C09K 7/00
[52] U.S. Cl. ..................... 507/121; 507/120; 507/122; 507/118; 507/119
[58] Field of Search .................... 507/121, 122, 507/120, 225, 226, 119, 118

[56] References Cited

U.S. PATENT DOCUMENTS

| | | | |
|---|---|---|---|
| 2,911,365 | 11/1959 | Burland et al. | 252/8.5 |
| 3,020,206 | 2/1962 | Patton et al. | 195/31 |
| 3,020,207 | 2/1962 | Patton | 195/31 |
| 3,252,904 | 5/1966 | Carpenter | 166/283 |
| 3,284,343 | 11/1966 | Shirley et al. | 208/221 |
| 3,393,168 | 7/1968 | Johnson | 524/539 |
| 3,509,113 | 4/1970 | Monagle et al. | 260/79.3 |
| 3,537,525 | 11/1970 | Sarem | 166/308 |
| 3,558,545 | 1/1971 | Lummus | 260/29.6 |
| 3,921,733 | 11/1975 | Clampitt | 175/65 |
| 4,009,329 | 2/1977 | Arney et al. | 536/84 |
| 4,098,700 | 7/1978 | Hartfiel | 252/8.5 |
| 4,107,057 | 8/1978 | Dill et al. | 507/226 |
| 4,171,296 | 10/1979 | Connelly et al. | 260/29.6 |
| 4,230,608 | 10/1980 | Mura | 260/29.4 |
| 4,257,903 | 3/1981 | Kucera et al. | 252/8.5 |
| 4,283,517 | 8/1981 | Perricone et al. | 526/229 |
| 4,293,427 | 10/1981 | Lucas et al. | 252/8.5 |
| 4,357,245 | 11/1982 | Engelhardt et al. | 252/8.5 |
| 4,395,524 | 7/1983 | Emmons et al. | 526/307 |
| 4,404,111 | 9/1983 | Bi et al. | 252/8.55 |
| 4,471,097 | 9/1984 | Uhl et al. | 526/240 |
| 4,502,964 | 3/1985 | Giddings et al. | 252/8.5 |
| 4,520,182 | 5/1985 | Turner et al. | 526/307.2 |
| 4,521,580 | 6/1985 | Turner et al. | 526/307.2 |
| 4,547,298 | 10/1985 | Novak | 507/118 |
| 4,547,299 | 10/1985 | Lucas | 252/8.5 |
| 4,568,471 | 2/1986 | Defosse | 252/8.55 |
| 4,587,283 | 5/1986 | Hille et al. | 524/3 |
| 4,671,883 | 6/1987 | Connel et al. | 507/107 |
| 4,674,574 | 6/1987 | Savoly et al. | 166/293 |
| 4,741,843 | 5/1988 | Garvey et al. | 252/8.514 |
| 5,134,118 | 7/1992 | Patel et al. | 507/121 |

Primary Examiner—Shean C. Wu
Attorney, Agent, or Firm—Arnold, White & Durkee

[57] ABSTRACT

This invention relates to an improved water based drilling fluid containing a controlled cross-linked polymeric fluid loss control agent. The novel polymeric fluid loss control agent of this invention exhibits improved thermal stability and other enhanced drilling fluid additive properties. The controlled cross-linking of the polymer of this invention results from the addition of specific amounts and types of cross-linking agents.

14 Claims, No Drawings

WATER-BASED DRILLING FLUIDS WITH HIGH TEMPERATURE FLUID LOSS CONTROL ADDITIVE

BACKGROUND OF THE INVENTION

1. Field of the Invention

The present invention relates to improved water-based drilling fluids that have utility in the drilling of subterranean boreholes. The improved drilling fluid of this invention includes a novel fluid loss control additive that demonstrates improved fluid loss control properties at high operating temperatures and under high pressure conditions. The improved drilling fluid of this invention also demonstrates improved performance characteristics in the presence of salts and solids.

During the drilling of an oil well using rotary drilling techniques, filtrate from the drilling fluid may be forced into the adjacent subterranean formation. In the case of aqueous based drilling fluids (sometimes referred to as drilling "mud") the filtrate is essentially water, which may have certain undesirable effects on the formation. Materials have been used in the past to control filtration rates of aqueous drilling fluids by plugging the pores in the formation by making filter cakes. Material used for sealing the filter cake pores have included materials such as starches, modified starches, cellulose, modified cellulose, synthetic polymers, such as polyacrylates, polyacrylamides, and lignites. These types of materials have certain well known shortcomings. For example, starches and cellulose products are not stable at high temperatures. Polyacrylates and polyacrylamides have limitations in high salts and divalent cation contaminations. The novel fluid loss control additive of this invention addresses many of the shortcomings of prior art additives.

2. The Prior Art

Various attempts have been made in the past to overcome such limitations. For example, U.S. Pat. No. 4,471,097 to Uhl et al. teaches the use of water soluble sulfonated polymers containing vinylimidazole for filtration control in high temperature and high calcium water base mud. The cross-linking of these polymers is optional. U.S. Pat. No. 4,293,427 to Lucas et al. teaches the use of acrylamide/2-acrylamido-2-methylpropane sulfonic acid (AMPS) copolymer as a filtration control agent in aqueous base drilling fluid. The cross-linking is optionally carried out by use of cationic salts. Ionic cross-linking is very labile and pH dependent. Turner et al. in U.S. Pat. Nos. 4,520,182 and 4,521,580 teaches the manufacturing of water soluble copolymers such as acrylamide/alkyl acrylamide as viscosifiers for water or brine systems. Griddings et al. in U.S. Pat. No. 4,502,964 teaches the use of terpolymer from AMPS, N,N-dimethyl acrylamide and acrylonitrile for high temperature fluid loss additive and rheology stabilizer for high temperature oil well.

My own U.S. Pat. No. 5,134,118 discusses the use of a water soluble polymer from AMPS and N,N-dimethyacrylamide in water base drilling fluids to increase the viscosity at low shear rates and improved fluid loss control. N,N-dimethylacrylamide/AMPS copolymer for petroleum recovery is disclosed in U.S. Pat. No. 4,404,111 by Bi et al. The use of water soluble copolymers from N,N-dimethylacrylamide and AMPS for fluid loss control agent is described in U.S. Pat. No. 4,547,299 to Lucas et al. The cross-linking is optional. Englehardt et al. in U.S. Pat. No. 4,357,245 describes the terpolymer from AMPS, N-vinylacetamide, and optionally acrylamide as drilling fluid additive for water base drilling fluid. U.S. Pat. No. 4,257,903 to Kucera et al. teaches drilling fluids containing cross-linked polysaccharide derivatives. Emmons et al. in U.S. Pat. No. 4,395,524 teaches the non-ionic and anionic water soluble polymers of acrylamide and N,N-dimethylacrylamide as thickening agents or rheology modifiers for water-base systems. However, the use of controlled cross-linked polymers and the specific micro-structure and the specific advantages provided thereby has not heretofore been known or appreciated.

Thus, there has been a well defined need for a drilling fluid additive that is thermally stable at temperatures in excess of 300° F., stable to high shear, and that is substantially unaffected by salts or solids contamination. The polymeric fluid loss control agent of this invention satisfies such needs by utilizing a unique controlled, cross-linked polymer in combination with an aqueous drilling fluid.

SUMMARY OF THE INVENTION

It is apparent to anyone selecting or using a drilling fluid for oil and gas exploration that an essential component of a selected fluid is that it be properly balanced to achieve the necessary characteristics for the specific end application. As stated hereinabove, the typical compositions include oil based muds, water based muds and pneumatic fluids. For purposes of this application, only oil and water based mud systems will be relevant. The vast majority of oil and gas exploration is done with water based muds. The primary reason for this preference is price and environmental compatibility. Traditional oil based muds made from diesel or mineral oils, in addition to being substantially more expensive than water based drilling fluids, are environmentally incompatible. As a result, the use of oil based muds has been historically limited to those situations where they are necessary.

The effectiveness of a drilling fluid and in particular the additives found in the drilling fluid are evaluated by measurement of certain characteristics of the drilling fluid system. The viscosity, gel strength, filtrate loss, contamination control and tolerance to divalent ion characteristics of drilling fluids and drilling systems are all directly attributable to the components of the drilling fluid. These properties, their definitions and a general explanation is found in a comprehensive treatise entitled *Composition and Properties of Drilling and Completion Fluids*, 5th Ed., George R. Gray and H. D. H. Darley, Gulf Publishing Company, (1988).

This invention relates to a polymeric fluid loss control agent for water base drilling fluids. The polymer of this invention shows excellent fluid loss control properties under high temperature and high pressure operating conditions. The polymer is a controlled cross-linked copolymer. The polymer is prepared from acrylamide

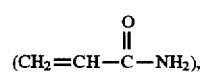

2-acrylamide-2-methyl propane sulfonic acid (AMPS* Lubrizole trade name)

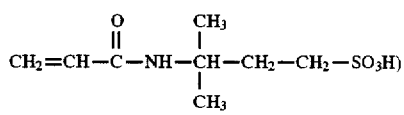

and cross linkable monomer methylene bis acrylamide

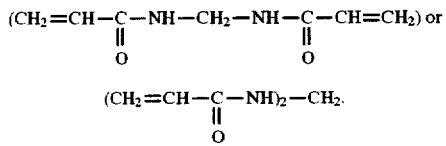

The amount of cross-linking in the preparation of the polymer plays a very important role in the development of the high temperature fluid loss control agent. For example, a highly cross linked polymer will be very rigid in physical structure and will be very difficult to hydrate in water base fluids. On the other hand a linear long chain polymer without cross-linking will hydrate very readily and viscosify of the water-base fluid and will also be adversely effected by drill solids, rendering the polymer less effective. The polymer of this invention is a light intramoleculerly cross-linked structure in which controlled cross-linking occurs within a few polymeric segments.

The cross-linked polymers of this invention are characterized as compact and spherical (globular) structures. Chemically bonded, intramolecularly cross-linked polymers take a compact spherical shape in aqueous solution as compared to a loosely expanded form of uncrosslinked linear chain polymers. This difference in the three dimensional physical structure of the polymer imparts excellent thermal stability due to resistance to alkaline hydrolysis. The three dimensional compact structure of cross-linked polymers provides steric hindrance to hydroxyl ions which are responsible for hydrolysis and instability of the polymers, especially at high temperature. Also, the spherical compact structure of the cross linked polymer becomes resistant to shear and other mechanical degradation of the polymer. Furthermore, the globular three dimensional physical structure renders such polymers less sensitive to drill solids as compared to uncross-linked linear long chain polymers. All these properties of the cross linked polymers of this invention make them more effective and practical for drilling fluid applications.

The monomer composition of the polymer also plays an important role in creating an effective and stable fluid loss control agent. Incorporation of anionic monomers will repel negatively charged hydroxide ions which promote hydrolysis of the acrylamide moiety of the polymer. Sulfonated monomers, such as AMPS, vinyl sulfonate, and styrene sulfonic acid will provide better tolerance to divalent anions such as calcium and magnesium. This results in an improved thermally stable fluid loss control agent.

Other monomers can be incorporated into the cross linked polymer composition depending upon the end use of the polymer or the type of aqueous base drilling fluid. For example, lipophylic monomers, such as isobornyl methacrylate, 2-ethyl hexyl acrylate, N-alkyl and N,N-dialkyl acrylamide, styrene and the like can be incorporated to improve the performance of the polymer in high brine containing drilling fluids. Also, to make it more tolerant to other electrolytes, anionic monomers, such as maleic acid, tetrahydrophthalic acid, fumaric acid, acrylic acid and the like can be incorporated into the cross-linked polymers.

A variety of additives can be included in the aqueous based drilling fluid of this invention. Specifically, materials generically referred to as gelling materials or organic polymers ("gelling agent"), thinners and fluid loss control agents are typically added to aqueous based drilling fluid formulations. Of these additional materials, each can be added to the formulation in a concentration as rheologically and functionally required by drilling conditions. Typical of gelling agents used in aqueous based drilling fluids are polymers such as PHPA (partially hydrolyzed polyacrylamide), biopolymers, bentonite, attapulgite, and sepiolite. Examples of biopolymers are guar gum, starch, xanthangum and the like.

Similarly, it has been found beneficial to add certain materials as thinners for aqueous based drilling fluids. Typically lignosulfonates, lignitic materials, modified lignosulfonates, polyphosphates and tannins are added. In other embodiments low molecular weight polyacrylates can also be added as thinners. Thinners are added to a drilling fluid in order to reduce flow resistance and gel development. Other functions performed by thinners include the reduction of filtration and cake thickness, to counteract the effects of salts, to minimize the effects of water on the formations drilled, to emulsify oil in water, and to stabilize mud properties at elevated temperatures.

The water based drilling fluid of this invention additionally includes a weighting material, sometimes referred to as a weighting agent. The type and quantity of weighting material used depends upon the desired density of the final drilling fluid composition. The preferred weight materials include, but are not limited to: barite, iron oxide, calcium carbonate, magnesium carbonate, and combinations of such materials and derivatives of such materials. The weight material is typically added in a quantity to result in a drilling fluid density of up to 24 pounds per gallon, preferably up to 21 pounds per gallon and most preferably up to 19.5 pounds per gallon.

The present invention is directed to a polymeric fluid loss control agent for aqueous base drilling fluids. The polymer of this invention is stable to high temperature, and substantially less affected by salts, specifically divalent cations, and solids than polymers currently used in drilling fluids. In particular, the polymer of this invention shows excellent fluid loss control properties under high temperature and high pressure conditions. The polymer of this invention is a controlled cross-linked copolymer. The preferred polymer is prepared from acrylamide, AMPS and methylene-bisacrylamide monomers. Other monomers can be incorporated in the cross-linked polymer of this invention according to the intended end use of the polymer.

The lightly cross-linked polymers of this invention can effectively control fluid losses without adversely affecting the viscosity of the water-base mud due to the compact and spherical (globular) three dimensional structure of the polymer. Due to covalently bonded cross-linked compact structure, the polymer has much better initial mixing properties and stability to high shear conditions. These functional characteristics of the polymer of this invention result from chemical control of the cross-linking process and the physical configuration of the resulting controlled cross-linked copolymer. The cross linking process is controlled chemically by the use of predetermined amounts of a cross-linking agent.

While the cross-linked polymer of this invention is effective as a high temperature fluid loss control agent, in its broadest form the drilling fluid of this invention may include thinners, gelling agents, weighting agents and other additive to provide desired performance characteristics to the drilling operation.

DETAILED DESCRIPTION OF THE PREFERRED EMBODIMENTS

The preferred polymeric fluid loss control agent of this invention is prepared from acrylamide, 2-acrylamido-2- methyl-propane sulfonic acid (AMPS is a trade name of Lubrizol, Inc.) and methylene-bisacrylamide. The polymer is described for purposes of this application as a controlled cross-linked copolymer.

The polymers prepared according to this invention are especially effective as high temperature fluid loss control additives for aqueous base drilling fluids. Functional characteristics of the drilling fluid containing this additive are relatively less affected by salt and solid contaminations and operating temperatures in excess of 300° F. Polymers prepared according to this invention exhibit outstanding tolerance toward ions of sodium, chloride and calcium, magnesium and other divalent cations frequently encountered in sea water drilling fluids. The cross-linked polymer additives of this invention are also substantially less affected by drilled solids and other solids present in drilling fluid composition than other polymers. The novel fluid loss control polymer additive of this invention is particularly tolerant of cations, such as magnesium and calcium, which are generally representative of a sea water environment. This tolerance is manifested by the excellent solubility of the polymer in sea water.

The microstructure of the cross-linked polymer and copolymer is an important factor in determining the final functional characteristics of the polymer's performance in drilling fluids. The copolymer sequence distributions, as well as the configurational differences in the copolymers, affect the properties of the ionic groups and thereby alter the ability to bind divalent ions. Divalent salts such as calcium and magnesium are strong chelating ions that can readily penetrate the hydration shell around a polymer chain to bind with ionic groups. High temperature operating conditions will activate both the polymer and the ion by increasing the mobility of both components. When a divalent ion binds two ionic groups in the polymers, an insoluble salt may form. These salt bonds (ionic bonds) may be intrachain or interchain. When the number of such bonds reaches a critical concentration, the polymer becomes insoluble and precipitation occurs, rendering the polymer functionally ineffective. This critical concentration of such ionic bonds is also affected by molecular weight and size and microstructure of the polymer, i.e., chemically covalent bonded cross-linked polymer.

The stability of the anionic charge of the polymer of this invention is a function of the basicity of the ionic charge of the polymer, which ultimately affects the precipitation characteristics of the drilling fluid additive. Experimentation and experience have shown that the stronger the basic charge of the anionic group, the more readily the anionic group will bind with divalent salts, resulting in less stability.

Acrylamide units in the copolymer chain of the fluid loss control additive of this invention are preferred sites for hydrogen bonding by anionic group in the polymer chain. Thus local polymer microstructure will directly affect the basicity of the neighboring anionic sulfonate group of the polymer of this invention. A charged group placed between two acrylamide units will be more stable than one placed between a charged group and acrylamide or between two other charged group (homopolymer of AMPS or AMPS-acrylate copolymer) because of the availability of the neighboring acrylamide units for forming stabilizing hydrogen bonds. The copolymers with N,N-dimethylacrylamide are not capable of forming hydrogen bonding to effectively stabilize the anionic charge of the sulfonate group. The dimethylacrylamide has no amide hydrogen available for hydrogen bonding.

The cross-linked acrylamide/AMPS copolymers of this invention exhibits a greater tendency to form an alternate copolymer due to lower reactivity ratio of acrylamide (0.5) compared to AMPS (1.01). The rate of copolymerization of acrylamide with sodium AMPS is highest at equal mole concentration of acrylamide and sodium AMPS. Thus, due to this high rate of copolymerization, equal monomer ratios gives the highest probability for producing alternation in acrylamide/AMPS monomers in the formation of the copolymer of this invention. This alternation in monomer sequence has the best stabilizing effect on the anionic charge of the sulfonate groups due to available hydrogen bonding with neighboring acrylamide hydrogen. The strong tendency for alternation of the acrylamide - sodium AMPS monomer pair in the copolymer and the related feed composition of other monomers are the contributing factors in producing the high temperature fluid loss control additive of this invention.

The high rate of polymerization at equimolar concentrations of acrylamide- sodium AMPS monomers gives the highest molecular weight of the copolymers of this invention. An increase in sodium AMPS monomer in acrylamide - sodium AMPS copolymer causes a decrease in molecular weight. Thus, by suitable choice of monomers and monomer ratios the properties of the polymers of this invention can be tailored according to the end use of the polymer. The performance of the polymer of this invention depends on several factors ranging from molecular weight to ionic charge to microstructure of the polymers.

The amount of cross-linking in the polymer plays a very important role in developing the desirable functional characteristics of the additive of this invention, such as high temperature stability. The amount of cross-linking controls the microstructure of the final polymer product. For example, highly cross-linked polymers will be rigid in structure and will be difficult to hydrate in water base fluids; furthermore, such polymers will be ineffective as fluid loss control agents. On the other hand, copolymers of acrylamide and AMPS monomers without cross-linking will be linear, long chain polymers and will hydrate readily and viscosify the water base fluid and will be adversely affected by drill solids, rendering the polymer less effective. The polymer of this invention is lightly intramolecularly cross-linked by chemical covalent bonds. The cross-linking is in the range of 0.01 mole percent to about 1.0 mole percent based on total monomer concentration. Methylenebisacrylamide is used as a cross-linking agent and will cross-link the segments of acrylamide - Na AMPS copolymers by chemical covalent bonds. Other mole ratios and cross-linkable monomers can be utilized depending upon the end use of the polymer. Other cross-linking agents are: divinyl benzene, allylmethacrylate, tetra allyloxethane and the like.

The cross-linked polymers of this invention are compact and spherical or globular in structure as opposed to non-cross linked polymers which are straight chain and not compact. For example, with the same molecular weight polymers, the cross-linked polymer shows much smaller hydrodynamic volume in aqueous solution when compared with non-cross linked linear long chain polymers. Chemical covalently bonded intramolecular cross-linked polymers of this invention take a very compact spherical shape in aqueous solution as compared to a loosely expanded form of uncross-linked linear chain polymers. This difference in three dimensional physical structure of the polymers of this invention imparts excellent thermal stability due to resistance to alkaline hydrolysis.

The three dimensional compact structure of cross-linked polymers provides steric hindrance to hydroxide ions which are responsible for hydrolysis and instability of the polymers, especially at high temperature. Along with steric hindrance, the monomer compositions, especially acrylamides which allow hydrogen bonding and alternation in monomer sequencing, make the polymer of this invention unique and useful as a high temperature fluid loss control agent in harsh drilling fluid conditions. Also, the spherical compact structure of the cross-linked polymer of this invention provides resistant to shear and other mechanical degradation. Furthermore, this globular three dimensional structure renders the polymers of this invention much less sensitive to drill solids. This is due to less hydrodynamic volume in the solution state as compared to uncross-linked linear long chain polymers. Methylenebisacrylamide provides covalent chemical bonds for cross-linking the polymers of this invention. The covalent bonds are more stable bonds and are not adversely effected by salt or pH conditions, as opposed to ionic bonds such as cross-linked anionic polymers with quaternary ammonium compounds or other metal ions. Methylenebisacrylamide is the preferred cross-linking agent, however, other cross-linking agents containing at least two olefinic double bonds, such as divinyl benzene, allylmethacrylate, tetra allyloxethane and the like can be used.

The monomer composition of the polymer also plays an important role in making effective and high temperature stable fluids loss control agents. Sulfonated monomers such as AMPS, vinyl sulfonate, styrene sulfonic acid and the like provide better tolerance to divalent cations such as calcium and magnesium encountered in drilling fluids. This results in an improved thermally stable fluid loss control agent for divalent cation contaminated systems such as sea water based drilling fluids. AMPS is a preferred monomer, however, depending upon the reactivity ratio and end use of the polymer, other sulfonated monomers can also be utilized for preparing an effective fluid loss control agent.

Other monomers can be incorporated in the cross linked polymer composition of this invention depending upon the end use of the polymer and the type of drilling fluid used. For example, lipophylic monomers such a isobornyl methacrylate, 2-ethylhexyl acrylate, N-alkyl and N,N-dialkylacrylamide, styrene and the like can be incorporated to make polymer more hydrophobically modified to improve the performance of the polymer in high brine containing drilling fluids. Also, to make it more tolerant to other electrolytes anionic monomers, such as maleic acid, tetrahydrophthelic acid, fumaric acid, acrylic acid, and the like, can be incorporated in cross-linked polymers of this invention.

A variety of polymerization systems may be employed in practicing the present invention, such as solution polymerization, gel polymerization and emulsion polymerization. Solution polymerization is carried out either in water or in an organic solvent. The resulting copolymer is isolated by distilling off the solvent or by precipitation. Precipitation is accomplished by adding a miscible organic solvent in which the copolymer is insoluble. Examples of suitable solvents are acetone, methanol, and other organic solvants.

In gel polymerization, the monomer composition is dissolved in water. Polymerization is initiated by introducing a free radical initiator. The polymerization initiates and the solution sets in the form of a gel. The gel is removed from the reaction vessel and extruded in the form of small pellets. The pellets are dried and ground to a powdered polymer.

The third and preferred method for polymerization is emulsion polymerization. Preparation of the polymers of this invention in an emulsion involves emulsifying the aqueous solution of monomers in a water immiscible organic solvent such as cyclohexane, mineral oil, vegetable oil, toluene or the like. Emulsification is accomplished by addition of 0.5% to 8%, preferably 1% to 4%, of a suitable water in oil type emulsifier. An emulsion is a substantially permanent heterogeneous liquid mixture of two or more liquids which do not normally dissolve in each other but which are held in suspension, one in the other, by small amounts of additional substances known as "emulsifiers." These emulsifiers modify the surface tension of the droplets to keep them from coalescing. Surface active agents are good emulsifiers. Typical among these are quaternary ammonium compounds, sulfonated oils, and polyhydric alcohol esters and ethers.

Polymerization is accomplished by addition of a suitable free radical initiator. This initiator may be either water soluble or oil soluble. Examples of free radical initiators used are azo compounds, benzoyl peroxide, azobissisobutyronitrile, azobis (2-amidinopropane) dihydrochloride. In addition, inorganic peroxy compounds such as ammonium persulfate, sodium persulfate or potassium persulfate are used. If necessary, the inorganic peroxy compounds can be used in combination with sodium or potassium metabisulfite. As a general rule, 0.01 to 15 grams of free radical initiator is used per 100 grams of total monomer.

The precursor monomers which are polymerized to form the drilling fluid additive of this invention are commercially available from a number of suppliers. AMPS, for example, is supplied by the Lubrizol Company. Methylenebisacrylamide may be obtained from a variety of commercial sources. Acrylamide is available from other major chemical companies, for example, Dow Chemical Company and American Cyanamid.

Thus in the most preferred embodiment of this invention acrylamide monomer of the following formula

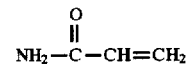

and AMPS monomer of the following formula

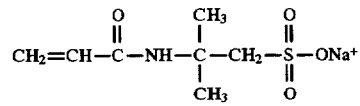

and methylenebisacrylamide of the following formula

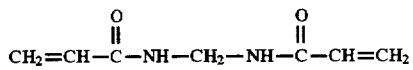

can be polymerized by emulsion polymerization in 50:50 mole percent ratio of acrylamide and AMPS, cross linked with methylenebisacrylamide at 0.15 mole percent of the total monomer composition of the polymer.

To effectively control the filtrate loss of aqueous base drilling fluids at high temperature the cross linked copolymers of this invention may be added to the drilling fluid in an amount between 0.01 and 10 percent by volume of the drilling fluid. It is particularly preferred that the mud composition of this invention contain the fluid loss control additive of this invention in an amount between 0.1 to 5.0 percent by volume of the drilling fluid. The amount needed will vary, of course, depending upon the type of drilling fluid, contaminations and temperature conditions. For example, sea water based drilling fluids requires higher concentration of polymer compared to fresh water mud and depleted polymers during the drilling operation has to be supplemented by adding additional polymers of this invention.

A variety of other additives can be included in the aqueous based drilling fluid of this invention. Specifically, materials generically referred to as gelling materials or organic polymers ("gelling agent"), thinners and fluid loss control agents are typically added to aqueous based drilling fluid formulations. Of these additional materials, each can be added to the formulation in a concentration as rheologically and functionally required by drilling conditions. Typical of gelling agents used in aqueous based drilling fluids are polymers such as PHPA (partially hydrolyzed polyacrylamide), biopolymers, bentonite, attapulgite, and sepiolite. Examples of biopolymers are guar gum, starch, xanthangum and the like.

Similarly, it has been beneficial to add certain materials as thinners for aqueous based drilling fluids. Typically ligosulfonates, lignitic materials, modified ligosulfonates, polyphosphates and tannins are added. In other embodiments low molecular weight polyacrylates can also be added as thinners. Thinners are added to a drilling fluid to reduce both flow resistance and gel development. Other functions performed by thinners include: reduction of filtration and cake thickness, counteraction of the effects of salts, minimization of the effects of water on the formations drilled, to emulsification of oil in water, and stabilization of mud properties at elevated temperatures.

The water based drilling fluid of this invention additionally includes a weighting material, sometimes referred to as a weighting agent. The type and quantity of weighting material depends upon the desired density of the final drilling fluid composition. The preferred weight materials include, but are not limited to: barite, iron oxide, calcium carbonate, combinations of such materials and derivatives of such materials. The weight material is typicaly added in a quantity to result in a drilling fluid density of up to 24 pounds per gallon, preferably up to 21 pounds per gallon and most preferably up to 19.5 pounds per gallon.

The superior thermal stability and performance of the polymers of this invention in controlling the filtrate loss from the drilling fluid can be determined by utilization of the standard API and high temperature high pressure fluid loss (HTHP) control tests. The tests are conducted in accordance with the procedures in API Bulletin RP 13 B-2, 1990, except where indicated otherwise. The following abbreviations are sometimes used in describing the results of drilling fluid experimentations.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 feet square (lb/100 ft$^2$).

"AV" is apparent viscosity which is another variable used in the calculation of viscosity characteristic of drilling fluid, measured in centipoise (cp) units.

"GELS" is a measure of the suspending characteristics, or the thixotripic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss, measured in milliliters (ml) according to API bulletin RP 13 B-2, 1990.

The preparation and the superior fluid loss control properties of the cross-linked polymer of this invention in a thermally elevated and contaminated environment is further described in the following Examples.

EXAMPLE 1

Synthesis of Polymers

The polymeric fluid loss control additives evaluated in this invention were prepared according to the emulsion polymerization method described herein and in accordance with the teachings of U.S. Pat. Nos. 4,171,296 and 4,230,608, which are incorporated herein by reference.

The invert emulsion was prepared in a three neck flask, equipped with a mechanical stirrer, a nitrogen dispersator, a thermometer, and a condenser. The water soluble monomers were dissolved in water and the pH was adjusted to 10.0 with sodium hydroxide. The oil soluble monomers were dissolved in oil (ISOPAR-M, an Exxon product and trade name). The oil soluble emulsifiers were dissolved in oil. The oil phase and water phase were mixed in the three neck flask with a mechanical stirrer to form an invert emulsion. The reaction mixture was purged with nitrogen for 30 min. The polymerization was initiated by addition of 0.01 g free radical initiator (ammonium persulfate). The temperature of the mixture increased up to 60° C. to 70° C. due to the exothermic reaction. After 2–3 hours, with continuous stirring, the reaction was complete. The resulting polymer was in a stable invert emulsion form. The active polymer concentration in the invert emulsion was between 25 to 35% by weight. The following sample descriptions show the compositions of the polymers and other materials utilized in the following Examples.

| Materials | Weight in Grams |
|---|---|
| Sample 1 | |
| Aqueous Phase | |
| Acrylamide (50%) | 72 |
| Water | 58 |
| AMPS (Lubrizol) | 61 |
| Caustic Soda (50%) | 23.5 |
| Methylenebisacrylamide | 0.17 |
| Oil Phase | |
| Isopar M (Exxon) | 100 |
| Span 80 (ICI) | 5.5 |
| NP-100 (Witco) | 1.0 |
| Sample 2 | |
| Aqueous Phase | |
| Water | 226 |
| KOH (50%) | 175 |
| Maleic Anhydride | 43 |
| AMPS | 97 |
| Acrylic Acid | 14 |
| Acrylamide (50%) | 241 |
| Versenex 80 (Dow Chemical) | 2 |
| Methylenebisacrylamide | 0.75 |
| Oil Phase | |
| ISOPAR M | 343 |
| Span-80 | 76 |
| NP-100 | 20 |
| Sample 2A | |

Sample 2A is the same formulation as Sample 2, except the cross-linking agent, methylenebisacrylamide, is omitted.

-continued

| Materials | Weight in Grams |
|---|---|
| Sample 3 | |
| Aqueous Phase | |
| Water | 226 |
| KOH 50% | 175 |
| Maleic anhydride | 43 |
| AMPS | 97 |
| Acrylic acid | 14 |
| Acrylamide (50%) | 241 |
| Versenex 80 | 2 |
| Methylenebis acrylamide | 0.5 |
| Oil Phase | |
| ISOPAR M | 343 |
| Span 80 | 76 |
| NP-100 | 20 |
| Sample 4 | |
| Aqueous Phase | |
| AMPS-2505 A (Lubrizol) | 63 |
| Water | 17 |
| Acrylamide 50% | 25.8 |
| Methylenebisacrylamide | 0.17 |
| Versenex 80 | 1 |
| Oil Phase | |
| ISOPAR M | 45 |
| Span 80 | 5.6 |
| NP-100 | 1.17 |
| Sample 5 | |
| Aqueous Phase | |
| Water | 35 |
| NAOH (50%) | 13 |
| AMPS | 33 |
| Acrylamide (50%) | 22 |
| Methylenebisacrylamide | 0.1 |
| Oil Phase | |
| ISOPAR M | 45 |
| Span-80 | 5.6 |
| NP-100 | 1.17 |
| Isobornylmethacrylate (Aldrich) | 6 |
| Sample 6 | |
| ASP-700 - A commercial product available from Nalco, a partially hydrolyzed polyacrylamide (PHPA) polymer without cross-linking. | |
| Sample 7 | |
| Kelzan XC - A commercial product available from Kelco Rotary, a modified natural biopolymer. | |
| Sample 8 | |
| Alcomer 242 - A commercial product available from Alco Chemical, a sulfonated copolymer. | |
| Sample 9 | |
| Aqueous Phase | |
| Water | 35 |
| NAOH (50%) | 13 |
| AMPS | 33 |
| Acrylamide (50%) | 23 |
| Oil Phase | |
| ISOPAR M | 45 |
| Span-80 | 5.6 |
| NP-100 | 1.17 |

To establish the high temperature stability of cross-linked polymers of this invention in a fresh water system, the samples were evaluated at 2.0 ppb (pounds per barrel) (active) in 16 ppg (pounds per gallon) water base mud. The polymers were compared with commercially available products identified by trade or generic names: (a) PHPA, (b) Hostadril 2825, and (c) Fluid Loss Additive from Drilling Specialties X-178. The following standard formulation was used for the test.

| | |
|---|---|
| 240 ml | Water |
| 10.0 g | Bentonite Gel |
| 4.0 g | Dispersant (Daxad-19 Hampshire) |
| 4.0 g | Mud Stabilizer (Aquatreat-MPS, Alco) |
| 401 g | Barite |
| 2 g | Test sample (active polymer) |
| 4 g | Thinner (TS-CFT, Techna Systems) |

The water base mud was prepared by mixing the components in water in a Hamilton Beach mixer. The pH was adjusted to 11.5 with 50% sodium hydroxide. The resulting mud was stabilized at 200° F. for 2–3 hours by hot rolling. It was then static heat aged at 400° F. for 16 hours. The muds were cooled to room temperature and static shear values were measured by the API procedure. The muds were then mixed for 30 minutes in a Hamilton Beach mixer. The rheologies were measured at 120° F. and HTHP fluid losses were measured at 350° F. and 500 psi differential pressure. The following are the results of these tests.

| | Sample 1 | Sample 6 | Sample 7 | Hostadril 2825 | Drilling Specialties-178 |
|---|---|---|---|---|---|
| PV | 40 | 47 | 30 | 37 | 35 |
| YP | 10 | 11 | 0 | 6 | 7 |
| Gels | 7/8 | 7/35 | | 7/10 | 6/7 |
| pH | 8.7 | 8.3 | | 9.2 | 8.4 |
| API | 3.1 | 9.0 | 28 | 4.0 | 4.7 |
| HTHP | 14.0 | 55+ | Total | 20.2 | 22.0 |
| Static Shear | 15 | 265 | 25 | 5 | 5 |

The above data establishes that the cross-linked polymer of this invention is very effective as a high temperature high pressures fluid control agent when compared with other commercially available fluid loss control agents.

EXAMPLE 2

The test mud used in Example 1 was contaminated with 3.5 gms of sea salt and 1.75 gms of potassium chloride to create a separate sample. The following results were obtained after heat aging at 400° F. for 16 hours.

| | Sample-1 | Hostadril 2825 | Drilling Specialties-178 |
|---|---|---|---|
| PV | 42 | 38 | 36 |
| YP | 19 | 20 | 18 |
| Gels | 8/17 | 14/35 | 10/28 |
| pH | 8.2 | 8.6 | 8.5 |
| API | 3.6 | 5.0 | 6.8 |
| HTHP | 13.6 | 22.0 | 24.8 |
| Static Shear | 125 | 135 | 125 |

The above data establishes that the cross linked polymer of this invention is an effective fluid loss control agent in the presence of salt contamination.

EXAMPLE 3

The 16.0 ppg mud used in Example 1 was contaminated with 3.5 ppb sea salt and 1.75 ppb potassium chloride. The polymer sample 1 of this invention was evaluated against commercially available partially hydrolyzed polyacrylamide (PHPA) and Alcomer 242 which is sulfonated copolymer with acrylamide. The mud was treated with 2.0 ppb polymer samples. The initial rheologies of these treated muds were measured at 120° F. They were then heat aged at 400° F. and API and HTHP/350° F. fluid losses were measured according to standard API procedures. The following table shows the test results.

|  | Sample 1 | Sample 6 | Alcomer 242 |
|---|---|---|---|
|  | I | I* | I |
| PV | 37 | Too | 40 |
| YP | 21 | Thick | 54 |
| Gels | 10/27 | To Measure | 25/85 |
|  | HA/400° F. | HA/400° F. | HA/400° F. |
| PV | 42 | 26 | 28 |
| YP | 19 | 14 | 12 |
| Gels | 8/17 | 9/45 | 3/20 |
| pH | 8.2 | 8.3 | 8.3 |
| API FL | 3.6 | 19.0 | 15.5 |
| HTHP | 13.6 | 94.0 | 82.0 |

The above data establishes that the cross-linked polymer of this invention does not produce excess viscosity initially as linear polymers do, and provides excellent thermal stability upon heat aging at 400° F. in a salt contaminated system, when compared with linear polymers.

EXAMPLE 4

The polymers of this invention were further evaluated in a 16 ppg water base mud. The mud formulation used in this test was same as used in Example 1. The muds were treated with 5.0 ppb (1.66 ppb active) polymer samples of this invention. The following results were obtained after heat aging at 400° F.

|  | Sample 1 | Sample 2 | Sample 3 | Sample 4 |
|---|---|---|---|---|
| PV | 34 | 28 | 31 | 24 |
| YP | 20 | 10 | 13 | 10 |
| Gels | 8/11 | 6/7 | 6/9 | 5/7 |
| Static Shear | 15 | 25 | 25 | 25 |
| pH | 8.8 | 8.6 | 8.8 | 8.5 |
| API FL | 3.1 | 6.1 | 4.9 | 5.8 |

The above data establishes that the polymer samples of this invention are stable up to 400° F. and have excellent fluid loss control properties.

EXAMPLE 5

The following test in 16 ppg water base mud was conducted to study the effect of contamination with solids, salt and brine. The mud was treated with 5.0 ppb of Sample 1 (1.66 ppb active) and heat aged to 400° F. for 16 hours

|  | Fresh Water | 3.5 ppb Sea Salt 1.5 ppb KCl | 5% V/V Zechstein* Brine | Revdust Solids, 35 ppb |
|---|---|---|---|---|
| PV | 29 | 29 | 41 | 41 |
| YP | 4 | 6 | 31 | 21 |
| Gels | 5/7 | 6/9 | 9/26 | 9/12 |
| API FL | 3.5 | 3.6 | 6.4 | 2.8 |
| HTHP FL | 15.8 | 14.9 | 21.0 | 17.0 |
| Static Shear | 15 | 65 | 10 | 55 |

The above data establishes that the polymer of this invention can be used as a high temperature fluid loss control agent in highly contaminated system.
*Zechstein brine formulation (% W/W)
18%—magnesium chloride 6.H$_2$O
5.5% potassium chloride
3% sodium chloride
2.5% magnesium sulfate
71% water

EXAMPLE 6

This example measures the effect of cross-linking on the initial viscosity of the polymer in water. One gram (active polymer) of the polymer sample was added to 300 grams of water. The sample was mixed for 15 minutes in a Hamilton Beach mixer. The rheologies were measured at room temperature.

| RPM | PHPA | Sample-9 (Linear Polymer) | Sample-2A (No Cross-Linker) | Sample-1 | Sample-2 | Sample-3 | Sample-4 |
|---|---|---|---|---|---|---|---|
| 600 | 75 | 48 | 44 | 18 | 16 | 13 | 15 |
| 300 | 55 | 32 | 33 | 10 | 9 | 7 | 8 |
| AV | 37.5 | 24 | 22 | 9 | 8 | 6.5 | 7.5 |

The polymers without cross-linking had high initial viscosities as compared to cross-linked polymers with the same monomer composition.

EXAMPLE 7

The following experiment was conducted to show the effect of shear on the polymers. Two grams of polymer sample were mixed with 300 grams of water. After mixing in a Hamilton Beach mixer for 15 minutes initial rheologies were measured. Then the polymer solution was sheared at 8000 rpm in a Silverson Lightning mixer. The rheologies were measured after 1.5 hours and 3.0 hours interval at room temperature.

|  | Sample-2A No Cross Linker | | | Sample-2 (Cross linked) | | |
|---|---|---|---|---|---|---|
| RPM | I | 1.5 hrs. | 3.0 hrs. | I | 1.5 hrs. | 3.0 hrs. |
| 600 | 55 | 41 | 35 | 20 | 21 | 22 |
| 300 | 34 | 28 | 23 | 11 | 12 | 13 |
| AV | 27.5 | 20.5 | 17.5 | 10 | 10.5 | 11 |

The above results indicate that the cross-linked polymers are stable to high shear conditions.

EXAMPLE 8

The following experiment was conducted to show the high shear stability of cross-linked polymer in the presence of barite (solids). 1.5 grams of polymer was added to 300 grams of water. After mixing for 10 minutes, 300 grams of barite was added. The fluid was mixed for 10 minutes. The initial rheologies were measured at room temperature. The samples were then sheared at 8000 rpm on Silverson Lightning mixer for 45 minutes. The rheologies were measured at room temperature. The following results were obtained.

| RPM | Sample-2A (without cross linking) | | Sample-2 (cross-linked) | |
|---|---|---|---|---|
| | I | 45 min. | I | 45 min. |
| 600 | 68 | 50 | 42 | 50 |
| 300 | 45 | 25 | 23 | 30 |
| PV | 23 | 25 | 19 | 20 |
| YP | 23 | 0 | 4 | 10 |
| Gels | ¾ | 1/1 | 3/5 | 7/15 |
| Comments | -settling of Barite | | -no settling of Barite | |

The above results indicates that cross-linked polymers of this invention are stable to high shear conditions in presence of solids.

What is claimed is:

1. An improved water base drilling fluid including a controlled cross-linked polymeric fluid loss control agent, said polymeric fluid loss control agent being water soluble and functionally effective at temperatures in excess of 300° F. to control fluid loss in the drilling of a subterranean well, said fluid loss control agent being the reaction product of a reaction mixture comprising an acrylamide monomer, a sulfonated anionic monomer selected from the group consisting of 2-acrylamide-2-methyl-propanesulfonic acid, vinyl sulfonate, styrene sulfonic acid, and combinations thereof; one or more non-sulfonated anionic monomers selected from the group consisting of maleic acid, tetrahydrophthalic acid, fumaric acid, acrylic acid and combinations thereof; and from 0.01 mole % to 1.0 mole % of a cross-linking agent.

2. The improved water based drilling fluid of claim 1 wherein said controlled cross-linked polymeric fluid loss control agent is the reaction product of a mixture of acrylamide, 2-acrylamide-2-methyl-propanesulfonic acid acrylic acid and cross linkable monomer methylenebisacrylamide.

3. The improved water based drilling fluid of claim 1 wherein said controlled cross-linked polymeric fluid loss control agent is prepared by the further addition of one or more lipophylic monomers to the reaction mixture prior to polymerization.

4. The improved water based drilling fluid of claim 3 wherein said one or more lipophylic monomers are selected from the group consisting of isobornyl methacrylate, 2-ethylhexylacrylate, N-alkylacrylamide, N,N-dialkylacrylamide, styrene, and combinations thereof.

5. The improved water based drilling fluid of claim 1 wherein said controlled cross-linked polymeric fluid loss control agent is prepared by the further addition of one or more non-sulfonated anionic monomers to the reaction mixture prior to polymerization.

6. The improved water based drilling fluid of claim 1 wherein said cross-linking agent has at least two double bonds.

7. The improved water based drilling fluid of claim 1 wherein said cross-linking agent is selected from the group consisting of methylenebisacrylamide, divinyl benzene, allyl methacrylate, tetraallyl oxethane, and combinations thereof.

8. An improved water based drilling fluid including a controlled cross-linked polymeric fluid loss control agent, said polymeric fluid loss control agent consisting essentially of a polymeric reaction product of acrylamide, one or more sulfonated anionic monomers selected from the group consisting of 2-acrylamide-2-methyl-propane sulfonic acid, vinyl sulfonate, styrene sulfonic acid, their alkali metal salts and combinations thereof; one or more non-sulfonated anionic monomers selected from the group consisting of maleic acid, tetrahydrophthalic acid, fumaric acid, acrylic acid and combinations thereof; and a cross linking agent selected from the group consisting of methylenebisacrylamide, divinyl benzene, allyl methacrylate, tetraallyl oxethane and combinations thereof, said polymeric fluid loss control agent being water soluble and functionally effective at temperatures in excess of 300° F. to control fluid loss in the drilling of a subterranean well with said drilling fluid.

9. The improved water based drilling fluid of claim 8 wherein the amount of the cross-linking agent utilized is from 0.01 mole % to 1.0 mole % based on the total number of moles of monomer used.

10. The improved water based drilling fluid of claim 8 wherein the sulfonated anionic monomer is the sodium salt of 2-acrylamide-2-methylpropanesulfonic acid and the cross-linking agent is methylenebisacrylamide.

11. The improved water-based drilling fluid of claim 8 wherein the acrylamide and the sulfonated anionic monomer are in equal molar amounts.

12. The improved water based drilling fluid of claim 8 further including:
an aqueous fluid, said aqueous fluid being selected from sea water, brine, or salt containing water solutions;
a gelling material, said gelling material being selected from the group consisting of partially hydrolyzed polyacrylamide, bentonite, attapulgite, sepiolite, guar gum, starch, xanthangum and combinations thereof;
a weighting material, said weighting material being selected from the group consisting of barite, iron oxide, calcium carbonate, derivatives of these and combinations thereof; and,
a thinner material, said thinner material being selected from the group consisting of ligosulfonates, lignitic materials, modified ligosulfonates, polyphosphates, tannins, low molecular weight polyacrylates and combinations thereof.

13. An improved water based drilling fluid including a polymeric fluid loss control agent, said polymeric fluid loss control agent being the polymeric reaction product of a reaction mixture comprising: acrylamide; one or more sulfonated anionic monomers selected from the group consisting of 2-acrylamide-2-methyl-propane sulfonic acid, vinyl sulfonate, styrene sulfonic acid, their alkali metal salts and combinations thereof; optionally, one or more lipophilic monomers selected from the group consisting of isobornyl methacrylate, 2-ethylhexylacrylate, N-alkylacrylamide, N,N-dialkylacrylamide, styrene and combinations thereof; one or more non-sulfonated monomers selected from the group consisting of maleic acid, tetrahydronaphthalic acid, fumaric acid, acrylic acid, and combinations thereof; and a cross linking agent selected from the group consisting of methylenebisacrylamide, divinyl benzene, allyl methacrylate, tetraallyl oxethane, and combinations thereof; said polymeric fluid loss control agent being water soluble and functionally effective at temperatures in excess of 300° F. to control fluid loss in the drilling of a subterranean well with said drilling fluid.

14. The improved water based drilling fluid of claim 13 wherein the sulfonated anionic monomer is the sodium salt of 2-acrylamide-2-methylpropanesulfonic acid in equal molar amounts with the acrylamide; and the cross-linking agent is methylenebisacrylamide in 0.01 mole % to 1.0 mole % of the total moles of monomer.

* * * * *